US006591300B1

(12) United States Patent
Yurkovic (10) Patent No.: US 6,591,300 B1
(45) Date of Patent: Jul. 8, 2003

(54) INTEGRATED MANAGEMENT APPLICATION

(75) Inventor: Robert J. Yurkovic, Ringwood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/345,378

(22) Filed: Jun. 30, 1999

(51) Int. Cl.[7] .............................................. G06F 15/173
(52) U.S. Cl. ..................... 709/226; 709/202; 709/220; 709/223; 709/224; 345/738; 345/739
(58) Field of Search ................................ 709/203, 220, 709/224, 226; 705/1, 14; 707/3.9, 10, 100, 102; 713/201; 706/50; 345/738, 739

(56) References Cited

U.S. PATENT DOCUMENTS

| | | | | |
|---|---|---|---|---|
| 5,828,990 A | * | 10/1998 | Nishino et al. ................. | 704/2 |
| 5,878,423 A | * | 3/1999 | Anderson et al. ........ | 379/88.17 |
| 5,983,218 A | * | 11/1999 | Syeda-Mahmood ............ | 707/3 |
| 6,029,172 A | * | 2/2000 | Jorna et al. .................. | 707/102 |
| 6,038,560 A | * | 3/2000 | Wical ........................... | 706/50 |
| 6,119,157 A | * | 9/2000 | Traversat et al. ........... | 709/220 |
| 6,148,335 A | * | 11/2000 | Haggard et al. ............ | 709/224 |
| 6,154,767 A | * | 11/2000 | Altschuler et al. .......... | 709/203 |
| 6,185,608 B1 | * | 2/2001 | Hon et al. ..................... | 707/10 |
| 6,223,177 B1 | * | 4/2001 | Tatham et al. ................. | 707/9 |
| 6,236,990 B1 | * | 5/2001 | Geller et al. .................. | 707/10 |
| 6,253,188 B1 | * | 6/2001 | Witek et al. ................... | 705/14 |
| 6,289,462 B1 | * | 9/2001 | McNabb et al. ............. | 713/201 |
| 6,314,447 B1 | * | 11/2001 | Lea et al. .................... | 709/105 |
| 6,321,202 B1 | * | 11/2001 | Raveis, Jr. ...................... | 705/1 |
| 6,405,175 B1 | * | 6/2002 | Ng ............................... | 705/14 |

* cited by examiner

Primary Examiner—Ayaz Sheikh
Assistant Examiner—Thu Ha Nguyen

(57) ABSTRACT

A computer-network based system/method integrates group-related information from a plurality of sources, such as a plurality of user and sub-applications, thereby allowing group members, e.g., members of a business organization, to access and view information entered by other group members from an integrated database. Authorized users retrieve and view such information using interactive web browser navigation and search "views," which enable the user to filter through and retrieve categorized information, such that time-, location-, organization-, and/or category-specific information is displayed. By integrating and categorizing information entered from different group members and sub-applications, group members can effectively manage and coordinate their activities, as well as share information related to the group operations. In one implementation, an integrated management application categorizes business-related information from organization members via a plurality of interactive sub-applications, including: an event planner sub-application for scheduling meetings, project deadlines, etc.; an action items sub-application for assigning tasks to be executed by one organization member for another member; a contacts sub-application for storing organization members' mailing addresses, e-mail addresses, phone numbers, etc.; a shared documents sub-application for archiving organization-related documents; a resource management sub-application allowing users to reserve facilities or other resources, e.g., a conference room for a meeting or a portable computer; and a services sub-application, e.g., for enabling the user to conduct on-line transactions.

23 Claims, 7 Drawing Sheets

FIG. 4C
SCREEN TO ADD ACTION ITEMS

```
ACTION ITEMS                          204-2                        204A
204-1 — TITLE ______________________   PRIORITY ______
204-3 — DATE ENTERED ______ DATE DUE —204-4   DURATION —204-5
204-6 — LOCATION ______________ (RELATES TO MAP)
204-7 — ORGANIZATION ______________   CATEGORY —204-8
        ( ) I OWE:    WHO ______________________
204-9 { ( ) OWED ME:  WHO ______________________
204-11 — PROJECT ________________________________
204-12 — NOTES __________________________________

( CONTACTS )    ( RESOURCES )    ( ENTER )
          204-14           204-15         204-13
```

FIG. 4D
SCREEN TO ADD CONTACT ITEMS

```
CONTACT ITEMS                         206-2                        206A
206-1 — NAME ______________________   PRIORITY ______
206-3 — DATE ENTERED ______ TITLE —206-4
206-5 — LOCATION ______________ (DEFAULT RELATES TO MAP)
206-6 — ORGANIZATION ______________   CATEGORY —206-7
        ADDRESS ________________________
206-8 { CITY, ST ZIP ____________________
        COUNTRY ________________________
206-9 — EMAIL __________________________
206-11 — PHONE __________________________

( EVENTS )      ( RESOURCES )    ( ENTER )
          206-13           206-14         206-15
```

FIG. 5

FIG. 6
SCREEN TO VIEW ACTION ITEMS

```
ACTION ITEMS                                                    501A
TITLE  TASK 1                           PRIORITY  HIGH
DATE ENTERED  D-M-Y    DATE DUE  D-M-Y   DURATION  X DAYS
LOCATION  NEW YORK          (RELATES TO MAP)
ORGANIZATION  GROUP A              CATEGORY _______
(X) I OWE:      WHO  XXXXXXX
( ) OWED ME:    WHO  _______________
PROJECT _______________________________
NOTES _________________________________

( CONTACTS )      ( RESOURCES )       ( ENTER )
```

FIG. 7
SCREEN TO SEARCH ACTION ITEMS

```
ACTION ITEMS SEARCH                                             601A
ENTER VALUE IN FIELD.....
TITLE _______________________           PRIORITY _______
DATE ENTERED _______  DATE DUE _______  DURATION _______
LOCATION _______________ (RELATES TO MAP)
ORGANIZATION _______________       CATEGORY _______
( ) I OWE:      WHO  _______________
( ) OWED ME:    WHO  _______________
PROJECT _______________________________
NOTES _________________________________

( CONTACTS )      ( RESOURCES )       ( ENTER )
```

INTEGRATED MANAGEMENT APPLICATION

BACKGROUND OF THE INVENTION

1. Field of the Invention

The present invention relates to computer-implemented information management tools.

2. Description of Related Art

A wide variety of computer software tools, such as word-processing and desk-top publishing programs, electronic mail, video conferencing, accounting programs, etc., are presently available to businesses for enhancing productivity and work quality. In addition to such tools, businesses are increasingly establishing corporate intranets to facilitate collaboration among co-workers by allowing users to share information and documents using web browsers.

Along with the above-mentioned advances, numerous business and project management software packages are currently available. Such conventional software packages are typically PC-based, i.e., are loaded to run on the computer of an individual user, and include numerous functions. Despite the substantial capabilities of typical business/project management applications, the large number of functions/options included in the application requires either a significant amount of user initiative to learn the program, or extensive training. The amount of training and effort needed discourages many employees from utilizing such applications. Furthermore, like PC-based applications in general, appropriate software must be installed at each user's location. Thus, deploying and upgrading such conventional applications is expensive. Still further, since these applications are PC-based, users cannot effectively access information entered by other members of their organization, such as a department or project team.

SUMMARY OF THE INVENTION

The present invention is a system and a method which integrates group-related information from a plurality of sources, such as from a plurality of users and/or sub-applications, thereby allowing group members, e.g., members of a business organization, to effectively access and view information entered by other group members.

In one embodiment, a computer network-based (or "web-based") integrated management application (IMA) categorizes and stores group-related information, such as information relevant to members of a business organization entered from a plurality of users and sub-applications, in an integrated database. Authorized users retrieve and view such information using interactive web browser navigation and search "views" which enable the user to filter through and retrieve categorized information, such that time-, location-, organization-, and/or category-specific information is displayed. By integrating and categorizing information entered from different group members and sub-applications, group members can effectively manage and coordinate their activities, as well as share information related to the group operations.

In one implementation, the IMA categorizes business-related information from organization members via a plurality of interactive sub-applications, including: an event planner sub-application for scheduling meetings, project deadlines, etc.; an action items sub-application for assigning tasks to be executed by one organization member for another member; a contacts sub-application for storing organization members' mailing addresses, e-mail addresses, phone numbers, etc.; a shared documents sub-application for archiving organization-related documents; a resource management sub-application allowing users to reserve facilities or other resources, e.g., a conference room for a meeting or a portable computer; and a services sub-application, e.g., for enabling the user to conduct on-line transactions. These sub-applications may be stored on a network server as part of the IMA, which categorizes and stores the information gathered via the individual sub-applications, for example by time, location, organization, and category. As a practical example, if an organization member wishes to add an event to each group member's calendar, the event planner sub-application prompts the user for event data, such as event title, data, time, location, and organization, which allows the IMA to categorize the event accordingly.

In one implementation, the IMA is one component of a space-time portal view such as disclosed in the co-pending application titled "SPACE/TIME PORTALS FOR COMPUTER SYSTEMS," filed Mar. 25, 1999, which allows a user to automatically retrieve customized information sets during web browsing and network access activities based on time and the user's geographic location.

Advantageously, by using: (1) a series of network-based sub-applications to gather information from group members; and (2) intuitive web browser displays which allow a user to navigate through and retrieve categorized information, users need not become familiar with a complex software package. Furthermore, using network-based sub-applications streamlines program deployment and upgrading due to the fact that the program need not be loaded at each user's location, and allows access to users from multiple platforms, e.g., UNIX workstations and Windows-based PCs. Still further, since the network-based sub-applications for inputting and processing group-related information are separate from the interactive output views which display categorized information to a user, sub-applications can be added to the IMA without changing the output views.

BRIEF DESCRIPTION OF THE DRAWINGS

Other aspects and advantages of the present invention will become apparent upon reading the following detailed description and upon reference to the drawings, in which.

DETAILED DESCRIPTION

The present invention is a system and a method for integrating group-related information from a plurality of sources, such as from a plurality of users and sub-applications, thereby allowing group members to effectively access and view information entered by other members.

In one embodiment, a network-based integrated business application (IMA) categorizes and stores data items, entered from various users and sub-applications, in an integrated database. Authorized users access previously categorized information via a series of interactive web browser displays which enable the user to effectively filter through, retrieve, and view integrated information from the database.

Figure 1:
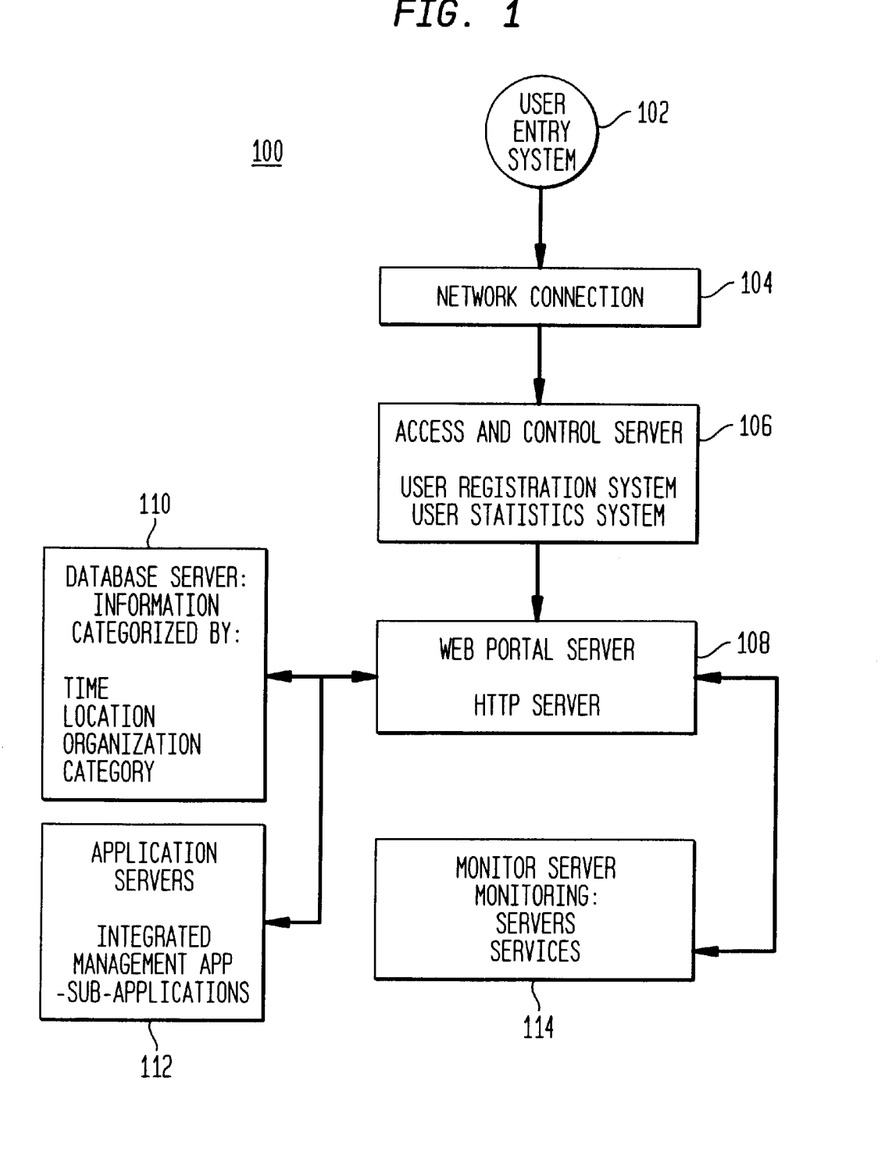
FIG. 1 illustrates a block diagram of a system configuration for implementing the network-based integrated business application according to an embodiment of the present invention.

Referring to FIG. 1, there is shown a block diagram of an exemplary computer network configuration for implementing embodiments of the present invention. The network configuration 100 includes a user entry/access system 102; an access and control server 106; a web portal server 108; a database server 110; application servers 112; and a monitor server 114.

The user entry/access system 102 may be, for example, a windows-based PC connected to a Local Area Network (LAN) and having web-browser software, such as an Java-enabled web browser. The application servers 112 store the IMA program and a plurality of sub-applications described in more detail below. In one exemplary embodiment, the application servers 112 store: an event planning sub-application; an action item sub-application; a contact sub-application; a shared document sub-application; a memorandum sub-application; a resource management sub-application; and a services sub-applications. The IMA and individual sub-applications may be embodied as program code which is loaded on the application servers 112 from a tangible media, such as a diskette or CD-ROM, or via transmission over a network connection.

The database server 110 is connected to the application servers 112, and includes a database which stores categorized data sets, e.g., time-, location-, organization-, and category-specific information. The web portal server 108 is connected to the database server 110 and the application servers 112 to gather information for display in accordance with user input. The monitor server 114 is connected to the web portal server 108 and provides user access to other miscellaneous servers and services (not shown). The user entry/access system 102 is connected to the access and control server 106 via a network connection 104. The access and control server 106 implements a user registration system to manage and control user access to the network resources.

Figure 2:
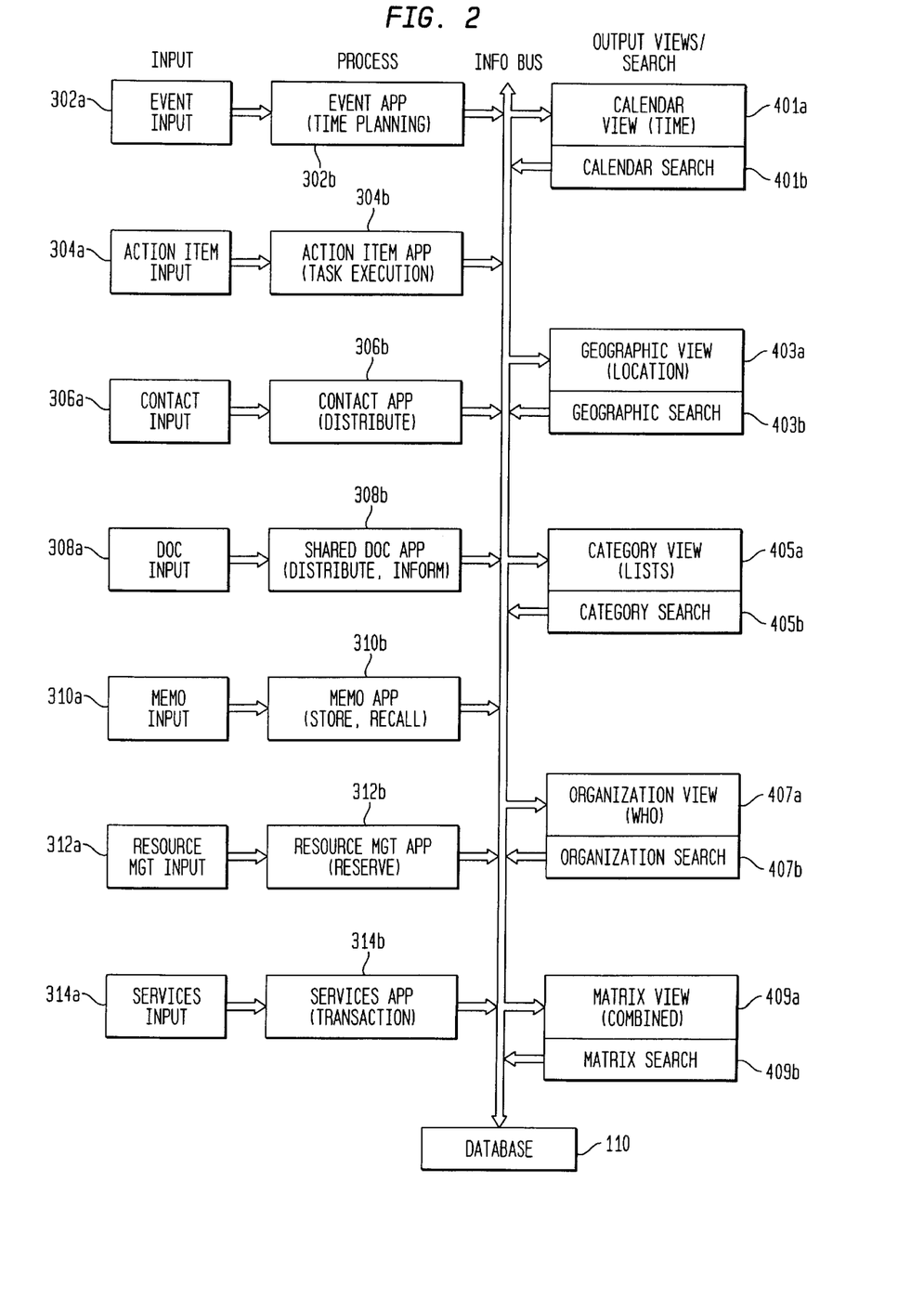
FIG. 2 is a conceptual block diagram which illustrates the separation between information input/processing and output views/searching in accordance with an embodiment of the present invention.

FIG. 2 is a conceptual block-diagram illustrating information input, processing, output, and searching functions performed in accordance with an embodiment of the present invention. Importantly, FIG. 2 illustrates the separation between user input while executing sub-applications, and user search/output functions for retrieving and displaying integrated information from the network database 110. In other words, many of the user output/search functions are not tied to the specific sub-applications which users execute to input group-related information. This separation between user input sub-applications and output/search views allows sub-applications to be added or removed without changing the search and output display views discussed below.

The integrated database 110 stores information sets categorized by the IMA after such information is entered by a user executing various sub-applications. In FIG. 2, the user inputs are shown as: an event input 302a; an action item input 304a; a contact input 306a; a document input 308a; a memorandum input 310a; a resource management input 312a; and a services input 314a. The specific set of inputs shown in FIG. 2 is merely illustrative, since additional, fewer, or different sub-applications may be executed to generate group-related information. As discussed in more detail below, these inputs are in practice realized as interactive displays which the web portal server 108 generates on a user's computer monitor to prompt the user for information related to the corresponding sub-application.

As illustrated in FIG. 2, each input is associated with a process which is executed upon receiving user input. Such processing is preferably performed on the network side, as opposed to at the user's location, so that the level of sophistication required at the user entry system 102 is minimized, thereby allowing a relatively simple and inexpensive user entry system. For the illustrative embodiment of FIG. 2, the event input 302a is associated with an event application 302b, such as a calendar or other time planning application; the action item input 304a is associated with an action item application 304b; the contact input 306a is associated with a contact application 306b; the document input 308a is associated with a shared document application 308b, e.g., for archiving input documents by subject, author, etc.; the memo input 310a is associated with a memo application 310b; the resource management input 312a is associated with a resource management application 312b, e.g., an application which allows users to reserve resource facilities; and the services input 314a is associated with a services application 314b, e.g., an application which allows a user to conduct on-line transactions.

It should be recognized that although a number of discrete sub-applications are shown in FIG. 2 corresponding to separate user inputs, such a configuration is shown for illustrative purposes since these sub-applications may in practice be embedded in the IMA.

The conceptual configuration illustrated in FIG. 2 further includes a plurality of user output views which include: a calendar view 401a; a geographic view 403a; a category view 405a; an organization view 407a; and a matrix view 409a (i.e., a composite of the calendar, geographic, category, and organization views). Each of these output views is associated with a search function which enables the user to browse for information from the integrated database 110 by interacting with the associated output view. More specifically, the calendar view 401a is associated with a calendar search function 401b; the geographic view 403a is associated with a geographic search function 403b; the category view 405a is associated with a category search function 405b; the organization view 407a is associated with an organization search function 407b; and the matrix view 409a is associated with a matrix search function 409b which represents a combination of the individual search functions mentioned above. These aspects of the conceptual configuration of FIG. 2 will become clear from the specific implementations and practical examples discussed below.

Figure 3:
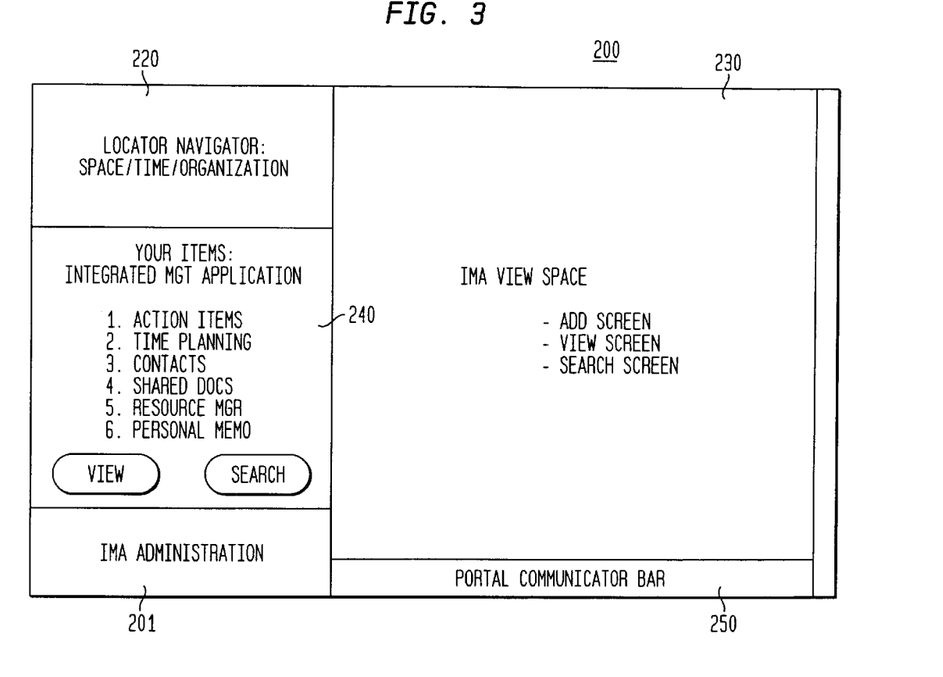
FIG. 3 illustrates an exemplary representation of a composite display generated on a user's monitor according to one embodiment of the present invention for displaying search, view, and input options, as well as retrieved group-related information.

FIG. 3 illustrates an exemplary composite display 200 which the web portal server 108 generates on a user's monitor according to an embodiment of the present invention, and which enables the user to input, search, and view group-related information. As shown in FIG. 3, the composite display 200 includes: an IMA Administration cell 201 which enables the user to select a particular sub-application and a function to be performed for the selected sub-application, e.g., adding, modifying, or deleting an item of the sub-application; a Locator Navigator cell 220 which enables the user to navigate through particular locations/time frames/organizations of interest to retrieve time-, location-, and/or organization-specific information from the integrated database 110; an IMA View Space cell 230 which displays add, view, and search screens to the user; a Sub-Application List cell 240 which displays a list of each available sub-application and a prompts the user to "view" or "search" items related to each listed sub-application; and a Portal Communicator Bar 250 which alerts the user of special events or items requiring attention, e.g., an up-coming appointment.

For the exemplary composite display 200 shown in FIG. 3, the Locator Navigator cell 220 corresponds to a combination of the calendar view 401a, geographic view 403a, and organization view 407a illustrated in the conceptual block diagram of FIG. 2. Furthermore, the Sub-Application List cell 240 corresponds to the category view 409a, and the combination of the Locator Navigator Cell 220 and the Sub-Application List Cell 240 corresponds to the matrix view 409a of FIG. 2.

Figure 4A:
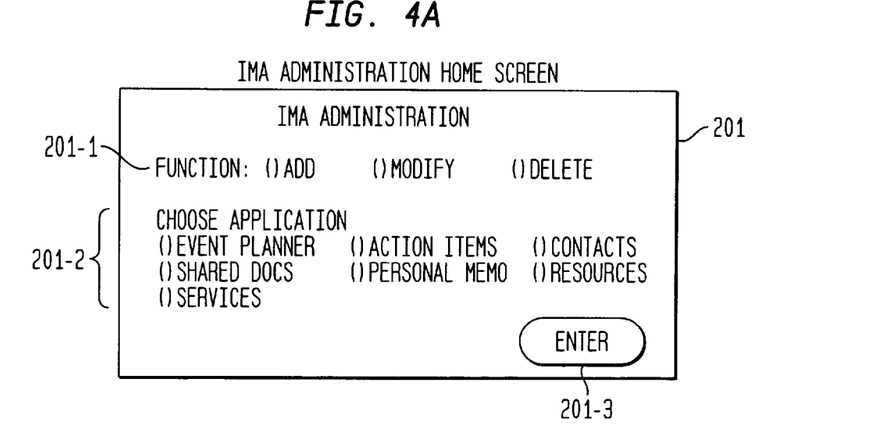
FIG. 4A illustrates an exemplary IMA Administration display screen which is generated on a user's monitor according to an embodiment of the present invention to prompt the user for a sub-application selection.

FIG. 4A illustrates an exemplary IMA Administration cell 201 which prompts the user to select a particular sub-application and a function to be executed for the selected sub-application. Specifically, the IMA Administration cell 201 includes a function selection input section 201-1 in which the user chooses one of an "Add," "Modify," and "Delete" function, for example using the computer's mouse-driven pointer, and an application selection section 201-2 in which the user selects one of a plurality of listed sub-applications, shown as: (1) Event Planner; (2) Action items; (3) Contacts; (4) Shared Docs; (5) Personal Memo; (6) Resources; and (7) Services.

Figure 4B:
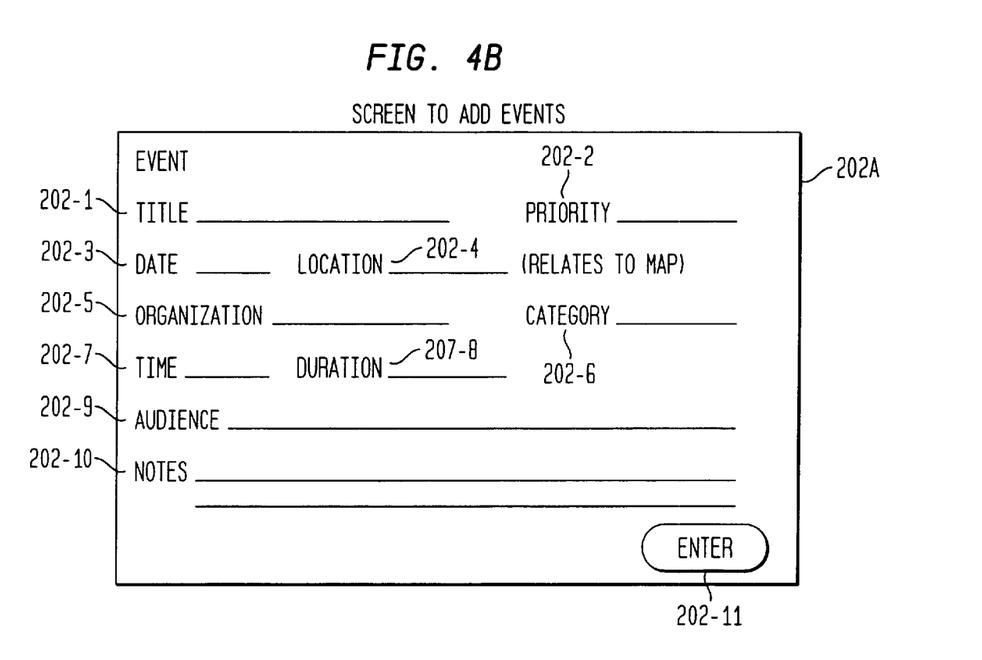
FIG. 4B illustrates an exemplary user input screen which is generated on a user's monitor after an event planner sub-application is initiated to prompt the user for event information to be added/modified/deleted in the integrated data base.

FIG. 4B illustrates an exemplary input screen generated in the IMA view space cell 230 when the user selects the "Add" function and the "Event Planner" sub-application in the IMA Administration cell 201. The exemplary "add Events" screen 202A shown in FIG. 4B prompts the user for information pertaining to a group-related event, such as scheduled meeting, project deadline, etc. More specifically, the "add Events" input screen 202A includes: a title input section 202-1 in which the user enters the name of the event; a priority input section 202-2 in which the user indicates that the event is a high or low priority; a date input section 202-3 in which the user enters the event date; a location input section 202-4 in which the user enters the event location; an organization input section 202-5 in which the user enters the organization to which the event applies (e.g., a meeting of the entire department or just a project team); a category input section 202-6 in which the user inputs a category label for the event; a time input section 202-7 in which the user inputs the scheduled event time; an audience input section 202-9 in which the user enters information on who should attend the event; and a notes section 202-10 in which the user inputs any additional information about the event. The "add Events" view 202A includes an enter section 202-11 which the user selects after entering the information discussed above.

Referring again to FIG. 2, the event application 302b associated with an event input 302a processes the information entered in the input sections of the "add Events" screen 202A described above. More specifically, the event application 302b is a time planning application which interacts with the calendar of each organization member affected by the input event so that their calendars reflect events which have been input by themselves and other members of their organization. Advantageously, this enables members of a business organization, such as a project team, to efficiently manage and coordinate their activities.

Furthermore, the event application 302b categorizes information entered by a user in the "add Events" screen 202A, and stores such categorized information with similarly categorized information in the integrated database 110. More specifically, the event application 302b creates a record for each of the entered events. Each event record includes a number of fields, corresponding to the each of the input sections of the "add Events" screen 202A described above. The event application further categorizes the added event information based on: (1) the date entered in the date input section 202-3, enabling subsequent retrieval of time-specific events; (2) the location entered in the location input section 202-4, enabling subsequent retrieval of location-specific events; (3) the organization name entered in the organization input section 202-5, enabling subsequent retrieval of organization-specific events; and (4) category based on the category name entered in the category input section 202-6, enabling subsequent retrieval of category-specific events.

Figure 5:
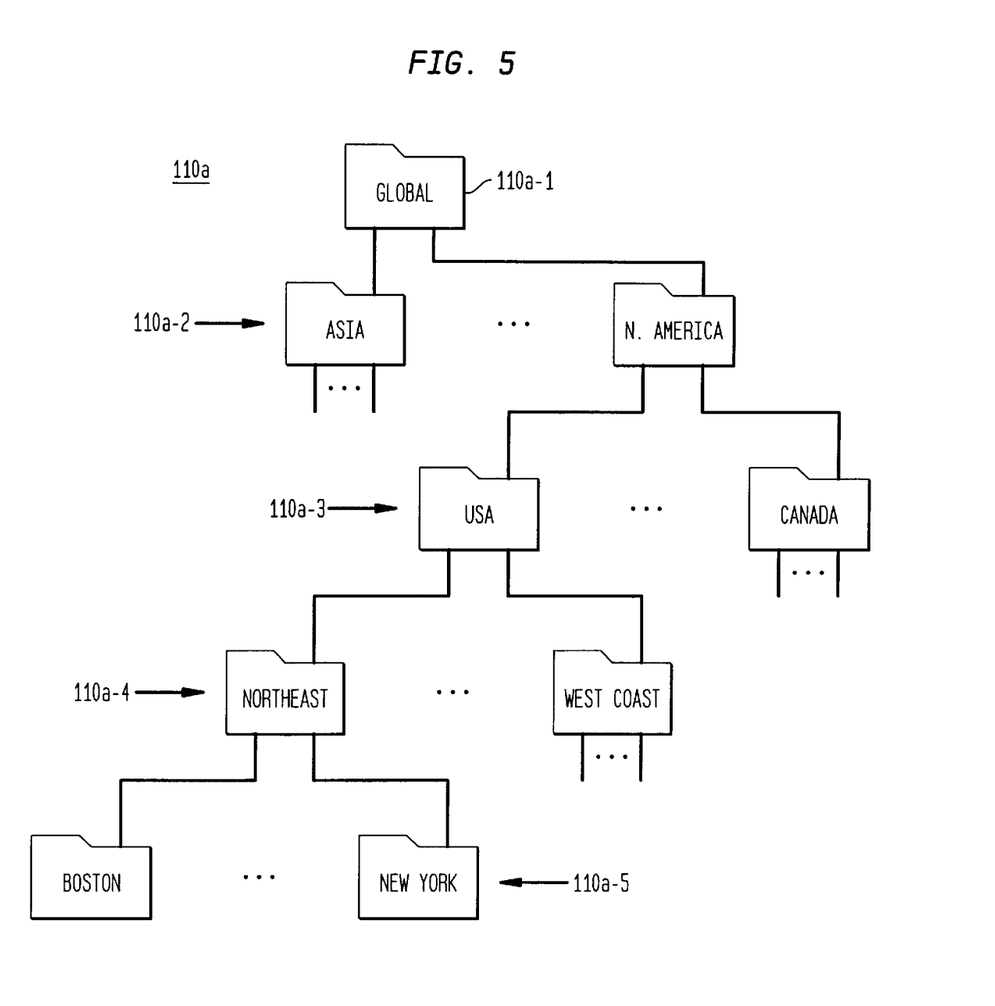
FIG. 5 illustrates an exemplary categorization for location-specific records stored in the integrated database in accordance with an embodiment of the present invention.

FIG. 5 illustrates an exemplary categorization of location-specific information in the integrated database 110. As seen in FIG. 5, the integrated database 110 includes a hierarchical file structure 110a for storing location-specific records, such as each of the event records entered in the "add Events" screen 202A and categorized based on the event location field (obtained from the location input section 202-4). In this example, the file structure 110a includes 5 levels of files/sub-files, corresponding to varying levels of location resolution. Specifically, the file structure 110a includes: (1) a global level file 110a-1 for storing all event records; (2) continental level sub-files 110a-2 for storing continent-specific event records; (3) country level sub-files 110a-3 for storing country-specific event records; (4) regional level sub-files 110a-4 for storing region-specific event records; and (5) city level sub-files 110a-5 for storing city-specific event records. As discussed in detail below, this hierarchical structure of event records stored in the integrated database 110 allows users to retrieve location-specific information, such as events and action items, entered by various group members.

Figure 4C:
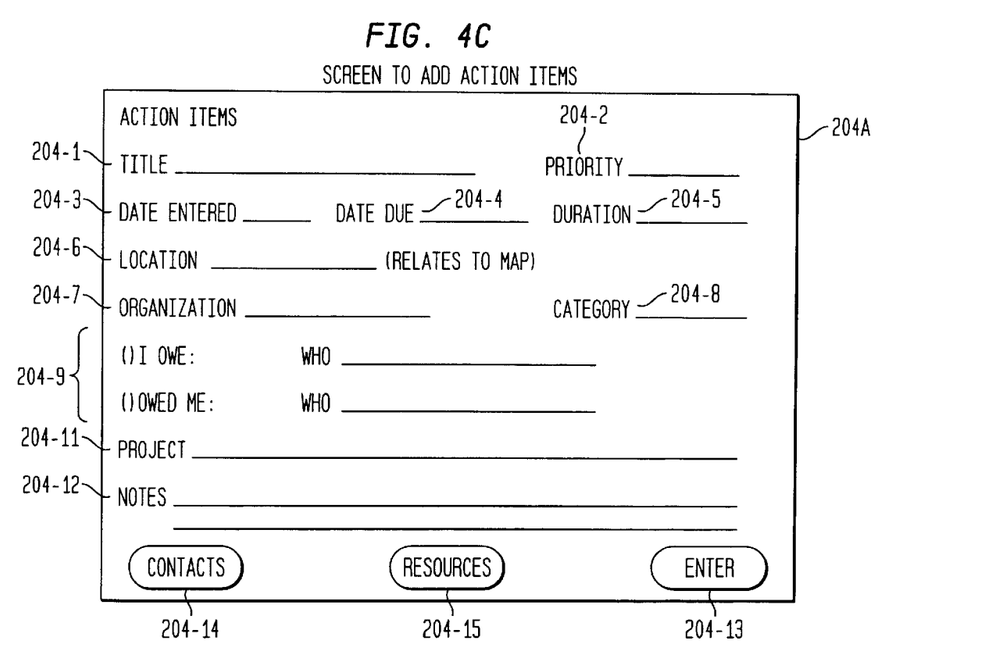
FIG. 4C illustrates an exemplary user input screen which is generated on a user's monitor after an action items sub-application is initiated to prompt the user for action item information to be added/modified/deleted in the integrated data base.

FIG. 4C illustrates an exemplary "add Action Items" screen 204A generated by the web portal server 108 in the IMA View Space cell 230 when the user selects the "Add" function and "Action Item" sub-application in the IMA Administration cell 201. The "add Action Items" screen 204A includes: a title input section 204-1 in which the user enters the name of the action item; a priority input section 204-2 in which the user indicates the action item as high or low priority; a date entered input section 204-3 in which the user enters the date on which the action item was assigned; a due data input section 204-4 in which the user indicates the action item due date; a duration input section 204-5 in which the user indicates the estimated time needed to compete the task; a location input section 204-6 in which the user indicates where the action item is to occur; an organization input section 204-7 in which the user enters the organization associated with the action item; a category input section 204-8 in which the user enters the action item category; an "I owe" and "owed me" input section 204-9 in which the user indicates whether the action item is a task which the user needs to perform for someone else (and for who), or whether the action item is owed the user (and the person who owes the task); a project input section 204-11 in which the user describes the project associated with the action item; and a notes section 204-12 in which the user inputs any additional information related to the action item.

The "add Action Items" screen 204A also includes an enter section 204-13 which the user selects to enter the information completed in the input sections described above. Furthermore, the "add Action Items" screen 204A allows the user to jump to other sub-applications, such as a "Contacts" sub-application by selecting a contacts link section 204-14, or a "Resources" sub-application by selecting a resources link section 204-15.

Referring again to FIG. 2, the action item application 304b associated with action item input function 304a processes the information entered in the input sections of the "add Action Items" screen 204A. More specifically, the action item application 304b, like the event planner application 302b, interacts with the calendar of each organization member affected by the input action item so that their calendars reflect action items which they owe and/or are owed by other members of their organization. Furthermore, the action item application 304b categorizes information entered by a user in the "add Action Items" screen 204A, and stores such categorized information with similarly categorized information in the integrated database 110. More specifically, the action item application 304b creates a record for each of the entered action items. Each action item record includes a number of fields, corresponding to each of the input sections of the "add Action Items" screen 204A described above. The action item application 304b further categorizes the added event based on: (1) the date entered in the due date input section 204-4, enabling subsequent retrieval of time-specific action items; (2) the location entered in the location input section 204-6, enabling subsequent retrieval of location-specific action items; (3) the organization name entered in the organization input section 204-7, enabling subsequent retrieval of organization-specific action items; and (4) category based on the category name entered in the category input section 204-8, enabling subsequent retrieval of category-specific action items. For example, location-specific action item records may be categorized in the integrated database 110 in a manner similar to location-specific events discussed above, e.g., as shown in FIG. 5.

Figure 4D:
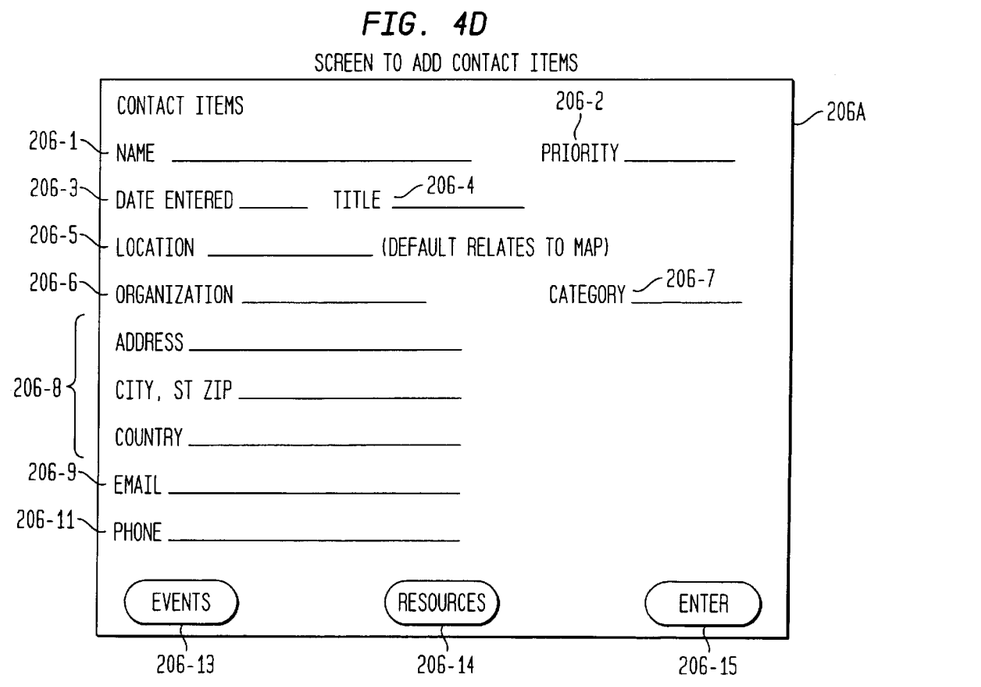
FIG. 4D illustrates an exemplary user input screen generated by a contact items sub-application to prompt a user for contact information to be added/modified in the integrated data base.

FIG. 4D illustrates an exemplary "add contact items" screen 206A generated by the web portal server 108 in the IMA View Space cell 230 when the "add" function and the "Contacts" application are selected in the IMA Administration cell 201. The "add Contact Items" screen 206A includes: a name input section 206-1 in which the user enters the contact name; a priority input section 206-2 in which the user enters that the contact is high or low priority; a date entered input section 206-3 in which the user enters the date the contact is being entered; a title input section 206-4 in which the user inputs the contact's title; a location input section 206-5 in which which the user enters the contact's location; an organization input section 206-6 in which the user inputs the contact's organization; a category input section 206-7 in which the user inputs a category label; an address input section 206-8 in which the user inputs the contact's mailing address; an e-mail input section 206-9 in which the user inputs the contact's e-mail address; and a phone number input section 206-11 in which the user enters the contact's phone number. The "add Contact Items" screen 206A also includes an enter section 206-15 which the user selects once the other input sections are completed. Furthermore, the user may use the "add Contact Items" screen 206A to jump to other sub-applications, such as the event planning sub-application using an "Events" link 206-13, or a resource management sub-application using a "Resources" link 206-14.

Referring again to FIG. 2, the contact application 306b associated with the contact input 306a processes the information entered in input sections of the "add Contact Items" screen 206A. The contact application 306b categorizes information entered by a user in the "add Contact Items" screen 206A, and stores such categorized information with similarly categorized information in the integrated database 110. More specifically, the contact application 306b categorizes the contact information based on: (1) the location entered in the location input section 206-5, enabling subsequent retrieval of location-specific contacts; (2) the organization name entered in the organization input section 206-6, enabling subsequent retrieval of organization-specific contacts; and (3) category based on the category name entered in the category input section 206-7, enabling subsequent retrieval of category-specific contacts.

Although not specifically illustrated, it will readily apparent to those skilled in the art that similar input screens can be generated in the IMA view space 230 for other sub-applications, such as a shared document sub-application, a memo sub-application, a resource management sub-application, and a services sub-application, so that additional information-types may be categorized and stored in the integrated database 110.

Figure 6:
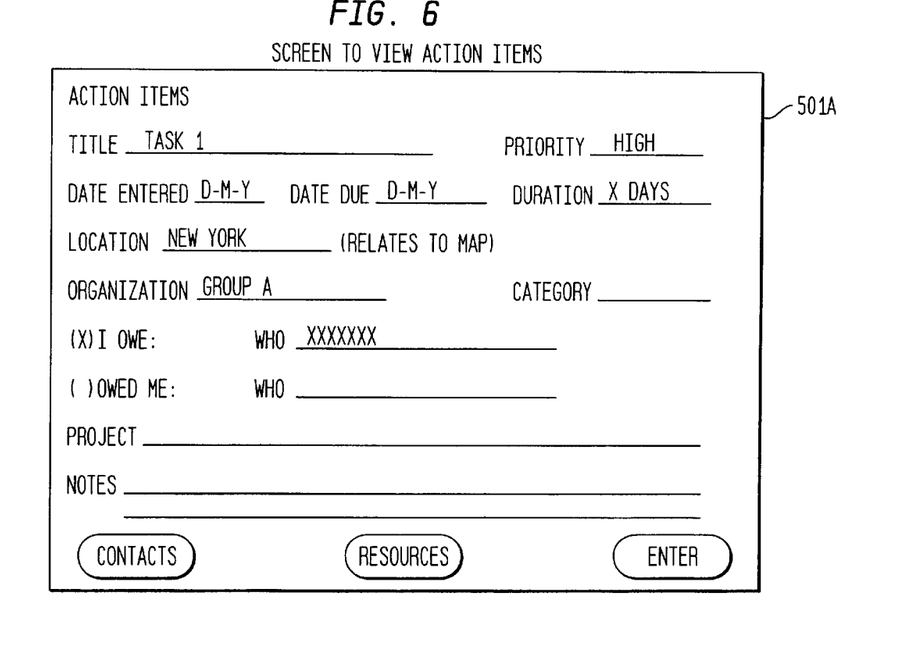
FIG. 6 illustrates an exemplary output view which displays previously entered action item information to a user.

In addition to displaying various input screens of the types described above, the IMA View Space cell 230 may be used to output "view screens" which display retrieved information from the integrated database 110. For example, the user may choose to view action items by making the corresponding selection in the Sub-Application List cell 240 so that a list of action items which relate to the user are displayed in the IMA View Space cell 230. The user may further select to view a particular action item in detail. FIG. 6 illustrates an exemplary action items view screen 501A which displays specific information relating to a particular action item, such as title, priority level, organization, etc. It should be apparent that similar output "view screens" may be displayed in the IMA View Space cell 230 for other information categories, such as events, contacts, documents, etc.

Figure 7:
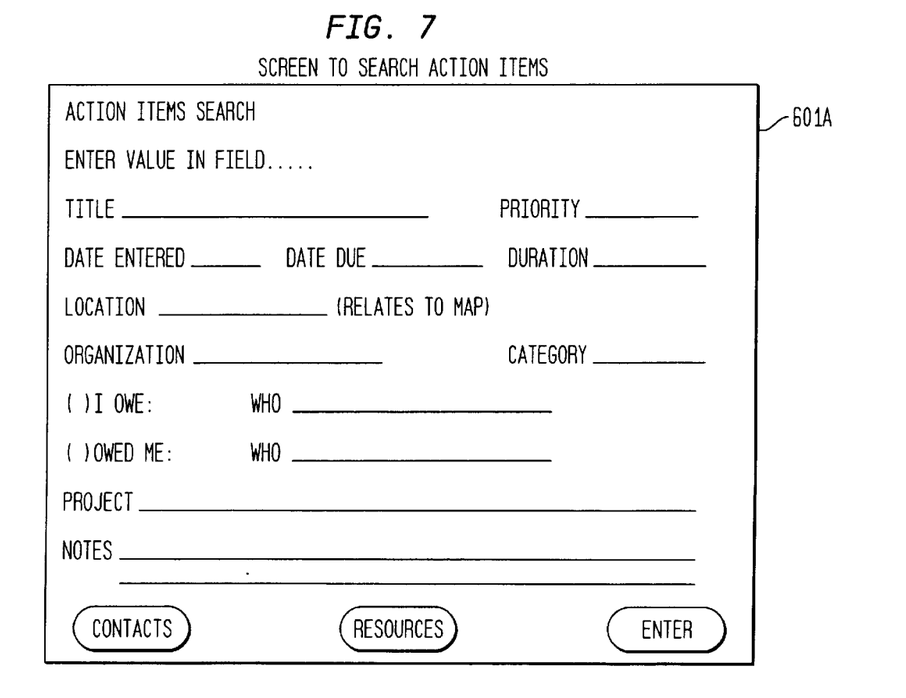
FIG. 7 illustrates an exemplary search view which allows the user to search for categorized information previously stored in the integrated database in accordance with an embodiment of the present invention.

Still further, the IMA View Space cell 230 may be used to display "search screens" which allow the user to search for information associated with one of the sub-applications listed in the Sub-Application List cell 240. For example, by selecting "search" and "1. Action items" in the Sub-Application List cell 240, an action item search screen, such as the search screen 601A illustrated in FIG. 7, is displayed in the IMA View Space 230. When the user fills in a field of the search screen 601A, such as location, organization, due date, etc., corresponding action items are retrieved and displayed in the IMA View Space cell 230. It should be apparent that similar output "search screens" may be displayed in the IMA View Space cell 230 for other information categories, such as events, contacts, documents, etc.

Figure 8:
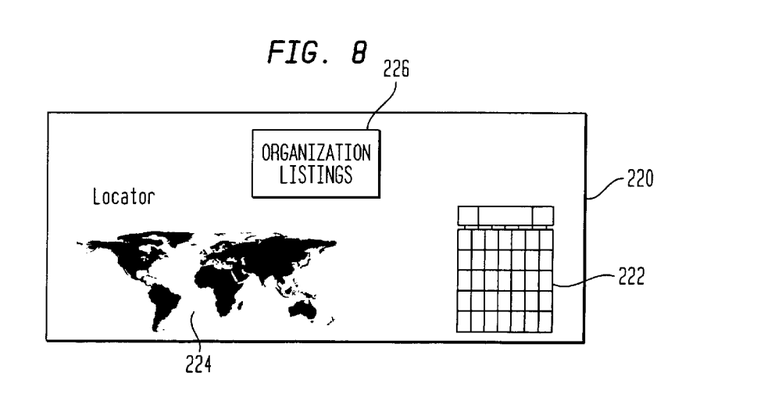
FIG. 8 illustrates an exemplary Locator Navigator view which may be generated as part of the composite display to enable a user to search for location-, time-, and organization-specific information previously integrated from a plurality of users and sub-applications.

FIG. 8 illustrates an exemplary Locator Navigator cell 220 which enables the user to select a particular location, time frame, and organization of interest to retrieve time-, organization-, and location-specific information from the integrated database 110. The exemplary Locator Navigator cell 220 includes a calendar section 222 which enables the user to search for time-categorized information (i.e., perform a calendar search 401b) previously entered by various users and sub-applications to be displayed in the IMA View Space cell 230. Although the calendar 222 shown in FIG. 8 shows a single month, the user may to view different time-frame resolutions, such a week, day, etc., depending on the time frame of interest.

The Locator Navigator cell 220 also includes a map section 224. The map section 224 shown in FIG. 8 is a large-scale map of the entire world. The user may select a particular region within the map, which prompts the web portal server 108 to generate a more detailed regional map. In other words, the user may select a map view of various resolutions until a sufficiently detailed area of interest is shown. By selecting a geographic region of interest, the user retrieves location-specific information from the integrated database 110 (i.e., perform a geographic search 403b) which is displayed in the IMA view space 230. For example, when the user selects the "time planning" sub-application and "view" in the sub-application list cell 240, only events which pertain to the selected location are displayed to the user in the IMA View Space cell 230.

The information displayed to the user may also be filtered down to events related to a particular organization, such as a department or project group, using the Locator Navigator cell 220. As shown in FIG. 8, the Locator Navigator cell 220 includes an organization listing section 226. The organization listing section 226 may display different levels of a corporations hierarchy, allowing the user to select the organizational level of interest and retrieve (i.e., perform an organization search 407b) only information related to that organization level.

By interactively selecting sub-application(s), location(s), organization(s) and time(s) from the constituent cells of the composite display 200 discussed above, the user is able to retrieve category-, time-, organization-, and location-specific information previously stored in the integrated database 100.

The present invention may further be implemented in a "space/time portal" such as discussed in the co-pending application titled "SPACE/TIME PORTALS FOR COMPUTER SYSTEMS" filed on Mar. 25, 1999, to allow a user to automatically retrieve customized information sets, including news, business information of the type described herein, etc., based on time and the user's geographic location. Still further, the IMA described above may be implemented in conjunction with an e-mail application such that e-mail messages are automatically sent out to user's to remind/notify people of upcoming events/actions.

It should be apparent to those skilled in the art that various other modifications and applications of this invention are contemplated which may be realized without departing from the spirit and scope of the present invention. For example, although the IMA is disclosed above for use in an intranet environment, the principles disclosed herein may also be incorporated on the Internet, in which case information stored on the database server 110 is received from/retrieved by users on different networks. Furthermore, although the detailed description above pertains primarily to sub-applications and integrated information related to business users, the principles disclosed herein may also be applied to other types of groups or organizations, such as civic or social organizations

What is claimed is:

1. A method for integrating group-related information from a plurality of sources, said method comprising:
   receiving group-related information from a plurality of sources;
   categorizing the received group-related information;
   storing the categorized group-related information with similarly categorized information previously entered; and
   generating a composite interface display that includes a searchable calendar display, a searchable map display, a searchable category list display and a searchable organization list display, for searching and retrieving the categorized and stored group-related information.

2. The method of claim 1, wherein said categorizing additionally categorizes received group-related information into one or more of a time-specific category, a location-specific category and an organization-specific category.

3. The method of claim 1, further comprising:
   searching said searchable calendar display to select one of a month, a week, and a day; and
   displaying month-, week-, or day-specific information on said composite display.

4. The method of claim 1, further comprising:
   searching said searchable map display to select a geographic region; and
   displaying location-specific information on said composite display.

5. The method of claim 1, further comprising:
   searching said searchable category list display to select a listed category; and
   displaying category-specific information on said composite display.

6. The method of 1, further comprising:
   searching said organization list display to select a listed organization; and
   displaying organization-specific information on said composite display.

7. The method of claim 1, further comprising:
   selecting each of a time-frame from said calendar display, a location from said map display, a category from said category list display, and an organization from said organization list display; and
   displaying each of time-, location-, category-, and organization-specific information on said composite display.

8. The method of claim 1, wherein said storing further includes storing categorized group-related information in a computer-network server.

9. A system for integrating group-related information from a plurality of sources, comprising:
   input means for receiving group-related information from a plurality of sources;
   categorizing means for categorizing received group-related information;

storing means for storing categorized group-related information with similarly categorized information previously entered; and display means for generating a composite interface display that includes a searchable calendar display, a searchable map display, a searchable category list display and a searchable organization list display, for searching and retrieving the categorized and stored group-related information.

10. The system of claim 9, wherein said categorizing means additionally categorizes received group-related information into a time-specific category, a location-specific category and an organization-specific category.

11. The system of claim 9, wherein said searchable calendar display is used to select one of a year, a month, a week, and a day so that year-, month-, week-, or day-specific information is output on the composite display.

12. The system of claim 9, wherein said searchable map display is used to select a geographic region so that location-specific information is output on the composite display.

13. The system of claim 9, wherein said searchable category list display is used to select a listed category so that category-specific information is output on the composite display.

14. The system of claim 9, wherein said searchable organization list display is used to select a listed organization so that organization-specific information is output on the composite display.

15. The system of claim 9, wherein a time-frame from said calendar display, a location from said map display, a category from said category list display, and an organization from said organization list display are selected so that time-, location-, category-, and organization-specific information is output on the composite display.

16. The system of claim 9, wherein said storing means is a server in a computer-network, and a plurality of sub-applications for generating input views on said composite display for entering group-related information are stored on said server.

17. The system of claim 16, wherein said computer network is an intranet.

18. The system of claim 16, wherein said computer network is the Internet.

19. The system of claim 16, wherein said plurality of sub-applications include at least one of an event planning sub-application, an action item sub-application, a contact input sub-application, a document input sub-application, a memorandum input sub-application and a services inputs sub-application.

20. The system of claim 16, wherein one of said sub-applications is an event input application for entering events to be added to a calendar of each member of an organization.

21. The system of claim 16, wherein one of said sub-applications is an action item application for entering action item information which is added a calendar of certain members of an organization.

22. The system of claim 9, wherein one of said sub-applications is a shared document application for entering group-related documents.

23. A computer readable medium storing program code for integrating group-related information from a plurality of sources, wherein, when the stored program code is executed by a computer, the computer executes an operation comprising:

receiving group-related information from a plurality of sources;

categorizing received group-related information;

storing categorized group-related information with similarly categorized information previously entered; and generating a composite interface display that includes a searchable calendar display, a searchable map display, a searchable category list display and a searchable organization list display, for searching and retrieving the categorized and stored group-related information.

* * * * *